(12) United States Patent
Martinez et al.

(10) Patent No.: US 7,394,257 B2
(45) Date of Patent: Jul. 1, 2008

(54) MODULAR DOWNHOLE TOOL SYSTEM

(75) Inventors: Ruben Martinez, Houston, TX (US); Jan W. Smits, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 177 days.

(21) Appl. No.: 10/907,368

(22) Filed: Mar. 30, 2005

(65) Prior Publication Data

US 2006/0220649 A1 Oct. 5, 2006

(51) Int. Cl.
*G01V 3/18* (2006.01)

(52) U.S. Cl. ........................ 324/356; 324/369

(58) Field of Classification Search ......... 324/347–351, 324/355–356, 369; 702/6–13; 181/102, 181/104–106; 166/250.01, 254.2, 250.07; 340/853.1–856.4
See application file for complete search history.

(56) References Cited

U.S. PATENT DOCUMENTS

| | | | |
|---|---|---|---|
| 3,944,910 A | | 3/1976 | Rau |
| 4,219,776 A | * | 8/1980 | Arulanandan ............... 324/323 |
| 4,468,623 A | | 8/1984 | Gianzero et al. |
| 4,567,759 A | | 2/1986 | Ekstrom et al. |
| 4,704,581 A | | 11/1987 | Clark |
| 5,198,770 A | * | 3/1993 | Decorps et al. ............. 324/367 |
| 5,235,285 A | | 8/1993 | Clark et al. |
| 5,495,174 A | * | 2/1996 | Rao et al. ................... 324/339 |
| 6,191,588 B1 | | 2/2001 | Chen |
| 6,315,062 B1 | * | 11/2001 | Alft et al. ..................... 175/45 |
| 6,564,883 B2 | | 5/2003 | Fredericks et al. |
| 6,837,314 B2 | | 1/2005 | Krueger et al. |
| 6,907,944 B2 | * | 6/2005 | Sale et al. ..................... 175/57 |
| 6,942,043 B2 | | 9/2005 | Kurkoski |
| 2004/0251048 A1 | * | 12/2004 | Kurkoski ....................... 175/41 |
| 2005/0001624 A1 | * | 1/2005 | Ritter et al. ................. 324/374 |
| 2005/0218898 A1 | * | 10/2005 | Fredette et al. ............. 324/342 |
| 2006/0117759 A1 | * | 6/2006 | Hall et al. ..................... 62/3.2 |

OTHER PUBLICATIONS

Plona et al., "Measurement of Stress Direction and Mechanical Damage around Stressed Boreholes using Dipole and Microsonic Techniques," SPE/ISRM 47234, pp. 123-129 (Trondheim, Norway Jul. 8-10, 1998).

* cited by examiner

*Primary Examiner*—Bot LeDynh
(74) *Attorney, Agent, or Firm*—Bryan L. White; Kevin P. McEnaney; Brigitte Echols

(57) ABSTRACT

A downhole tool for formation logging includes a tool body configured to move in a borehole; and at least one sensor module mounted in at least one mounting location on the tool body, wherein the at least one sensor module is interchangeable with other sensor modules that make different measurements. A downhole tool may further comprise a measurement system disposed in the tool body, wherein the measurement system is operatively coupled to the at least one sensor module.

9 Claims, 3 Drawing Sheets

MODULAR DOWNHOLE TOOL SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF INVENTION

1. Field of the Invention

The invention relates generally to downhole tools for well logging. More particularly, the invention relates to improved designs of downhole tools to facilitate a logging system to adapt to different situations.

2. Background Art

Oil and gas industry uses various tools to probe the formation penetrated by a borehole in order to locate hydrocarbon reservoirs and to determine the types and quantities of the hydrocarbons. These tools may be used to probe the formations after the well is drilled, i.e., wireline tools. Alternatively, these tools may be included in a drilling system and make measurements while drilling, i.e., measurement-while-drilling (MWD) tools or logging-while-drilling (LWD) tools. In addition, measurements may also be made while the drill string is being tripped out of the well, i.e., logging-while-tripping (LWT) tools. The difference between the MWD and LWD tools is not germane to the present invention. Thus, in the following description, LWD will be used to generally include these two different types of operations.

FIG. 1 shows a general illustration of a drilling rig and an LWD tool in a borehole. The rotary drilling rig shown comprises a mast 1 rising above ground 2 and is fitted with a lifting gear 3. A drill string 4 formed of drill pipes screwed one to another is suspended from the lifting gear 3. The drill string 4 has at its lower end a drill bit 5 for the drilling well 6. Lifting gear 3 consists of crown block 7, the axis of which is fixed to the top of mast 1, vertically traveling block 8, to which is attached hook 9, cable 10 passing round blocks 7 and 8 and forming, from crown block 7, on one hand dead line 10a anchored to fixed point 11 and on the other active line 10b which winds round the drum of winch 12.

Drill string 4 is suspended from hook 9 by means of swivel 13, which is linked by hose 14 to mud pump 15. Pump 15 permits the injection of drilling mud into well 6, via the hollow pipes of drill string 4. The drilling mud may be drawn from mud pit 16, which may be fed with surplus mud from well 6. The drill string 4 may be elevated by turning lifting gear 3 with winch 12. Drill pipe raising and lowering operations require drill string 4 to be temporarily unhooked from lifting gear 3; the former is then supported by blocking it with wedges 17 in conical recess 18 in rotating table 19 that is mounted on platform 20, through which the drill string passes. The lower portion of the drill string 4 may include one or more tools, as shown at 30, for investigating downhole drilling conditions or for investigating the properties of the geological formations. Tools 30 shown may be any type of tools known in the art.

Variations in height h of traveling block 8 during drill string raising operations are measured by means of sensor 23 which may be an angle of rotation sensor coupled to the faster pulley of crown block 7. Weight F applied to hook 9 of traveling block 8 may also be measured by means of strain gauge 24 inserted into dead line 10a of cable 10 to measure its tension. Sensors 23 and 24 are connected by lines 25 and 26 to processing unit 27 which processes the measurement signals. Recorder 28 is connected to processing unit 27, which is preferably a computer.

Different tools (shown as 30 in FIG. 1) used in formation logging are often based on different sensor technologies for probing different formation properties. For example, resistivity tools may be used to measure formation conductivity or its inverse, resistivity. Such tools include, for example, Formation MicroScanner/MicroImager sold under the trade name of FMS/MI™ and Oil-Based Mud Imager sold under the trade name of OBMI™ from Schlumberger Technology Corp. (Houston, Tex.). FMS/MI™ is a wireline tool for use in water based mud (WBM), while OBMI™ is a wireline tool for use in an oil-based mud (OBM). For description of a tool like OBMI™, see U.S. Pat. No. 6,191,588 B1 issued to Chen and assigned to the assignee of the present invention.

Other types of resistivity tools may include Resistivity-at-bit (RAB™ from Schlumberger Technology Corp.) and Geo-Vision Resistivity (GVR™ from Schlumberger Technology Corp.). These tools (RAB™ and GVR™) are LWD tools for use in a water-based mud (WBM); they use current injection to probe the resistivity of formations. For description of the working principles of the RAB™ and GVR™ tools, see U.S. Pat. No. 5,235,285 issued to Clark et al. and assigned to the assignee of the present invention.

In addition to resistivity, other formation properties commonly logged for oil and gas exploration include formation density, formation porosity, formation sedimentation structures, etc. These other formation properties may be logged with ultrasonic energy, gamma radiation, neutron radiation, or nuclear magnetic resonance, to name a few. Ultrasonic Borehole Imager (UBI™ from Schlumberger Technology Corp.) is a wireline tool that uses ultrasonic echo pulses for the measurements. Azimuthal density neutron tool (ADN™ from Schlumberger Technology Corp.) and vision density neutron tool (VDN™ from Schlumberger Technology Corp.) are LWD tools that use neutron radiation to probe formation density.

Complexity of formation logging arises not only from diverse tools based on different working principles, but also from different requirements that may depend on, for example, geology, drilling practices, and client priorities. Furthermore, the different requirements may also be dictated by different muds, different formation properties of interest, different ranges of values of the formation properties, and different requirements for accuracy and resolution.

To minimize the time and cost of a logging operation, an assortment of tools, if they are compatible, may be attached to a single logging system. Otherwise, a logging operation may require multiple runs. In order to increase the efficiency and to reduce the cost of a logging operation, it is desirable that various tools, sensors, and their components be readily interchangeable and similar components can be readily shared with different tools.

SUMMARY OF INVENTION

One aspect of the invention relates to downhole tools for formation logging. A downhole tool in accordance with one embodiment of the invention includes a tool body configured to move in a borehole; and at least one sensor module mounted in at least one position on the tool body, wherein the sensor module is interchangeable with other sensor modules that make different measurements. The downhole tool may further include a measurement system disposed in the tool body, wherein the measurement system is operatively coupled to the at least one sensor module.

Another aspect of the invention relates to methods for designing downhole tools. A method in accordance with one embodiment of the invention includes providing at least one mounting location on a tool body configured to move in a borehole, wherein the at least one mounting position is configured to house at least one modular sensor.

Another aspect of the invention relates to methods for formation logging. A method in accordance with one embodiment of the invention includes disposing a tool in a borehole penetrating a formation, wherein the tool includes a tool body, and at least one sensor module mounted in at least one mounting position on the tool body; and acquiring measurements using the tool to provide a formation property.

Other aspects and advantages of the invention will be apparent from the following description and the appended claims.

DETAILED DESCRIPTION

Embodiments of the invention relate to downhole tools that may be incorporated in drilling assemblies for making formation property measurements. Some embodiments of the invention can provide high-resolution measurements to produce images of one or more formation properties of interest. Downhole tools in accordance with embodiments of the invention are based on modular designs. They may include small sensor (or other component) modules adapted to be coupled to a base system. In accordance with embodiments of the invention, the base system architecture is designed in such a way that most of the sub-systems are not sensor specific. Accordingly, various sensor modules/components may be used with a common base system to provide different measurements.

Figure 1:
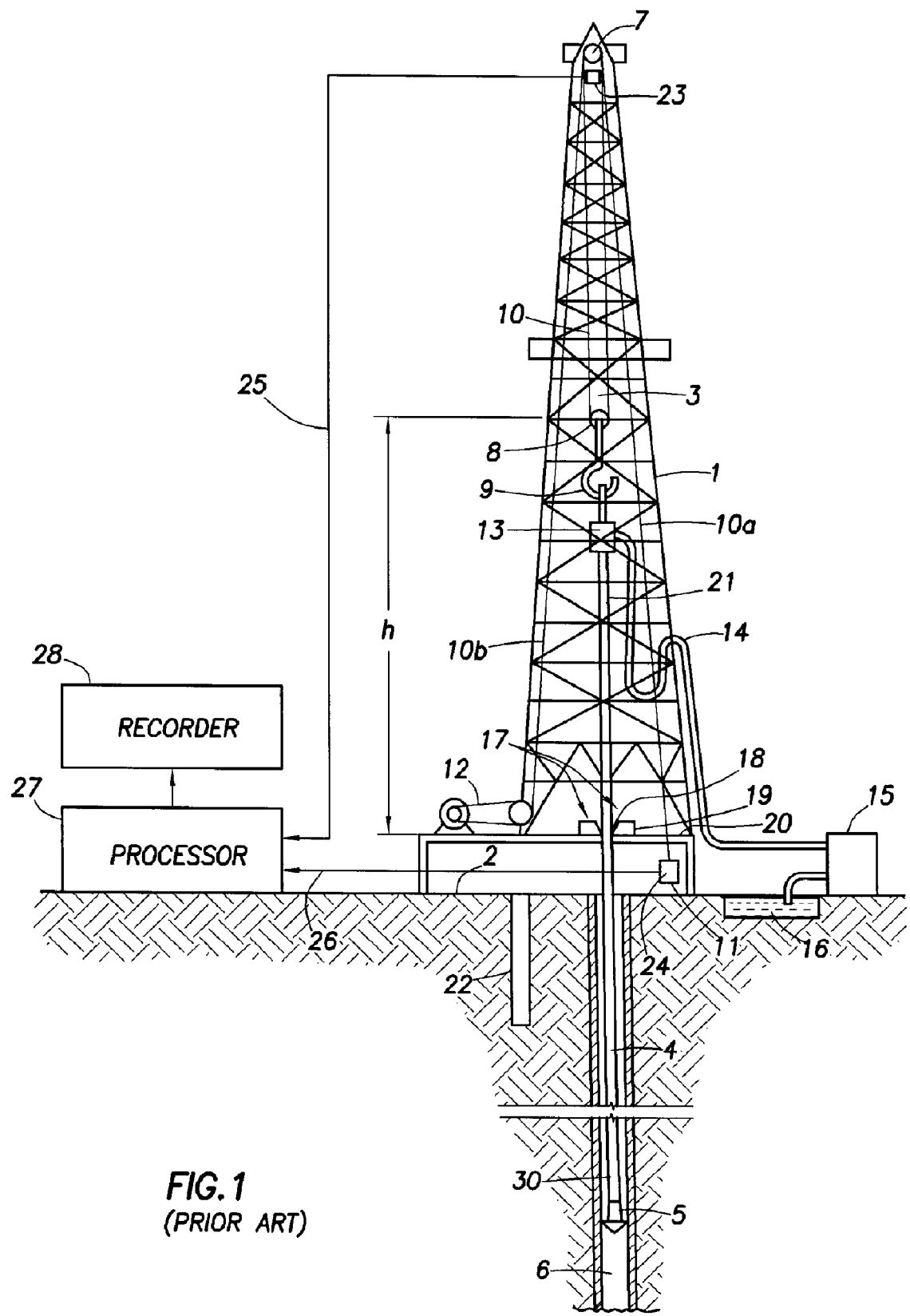
FIG. 1 shows prior art logging-while-drilling system.
Figure 2:
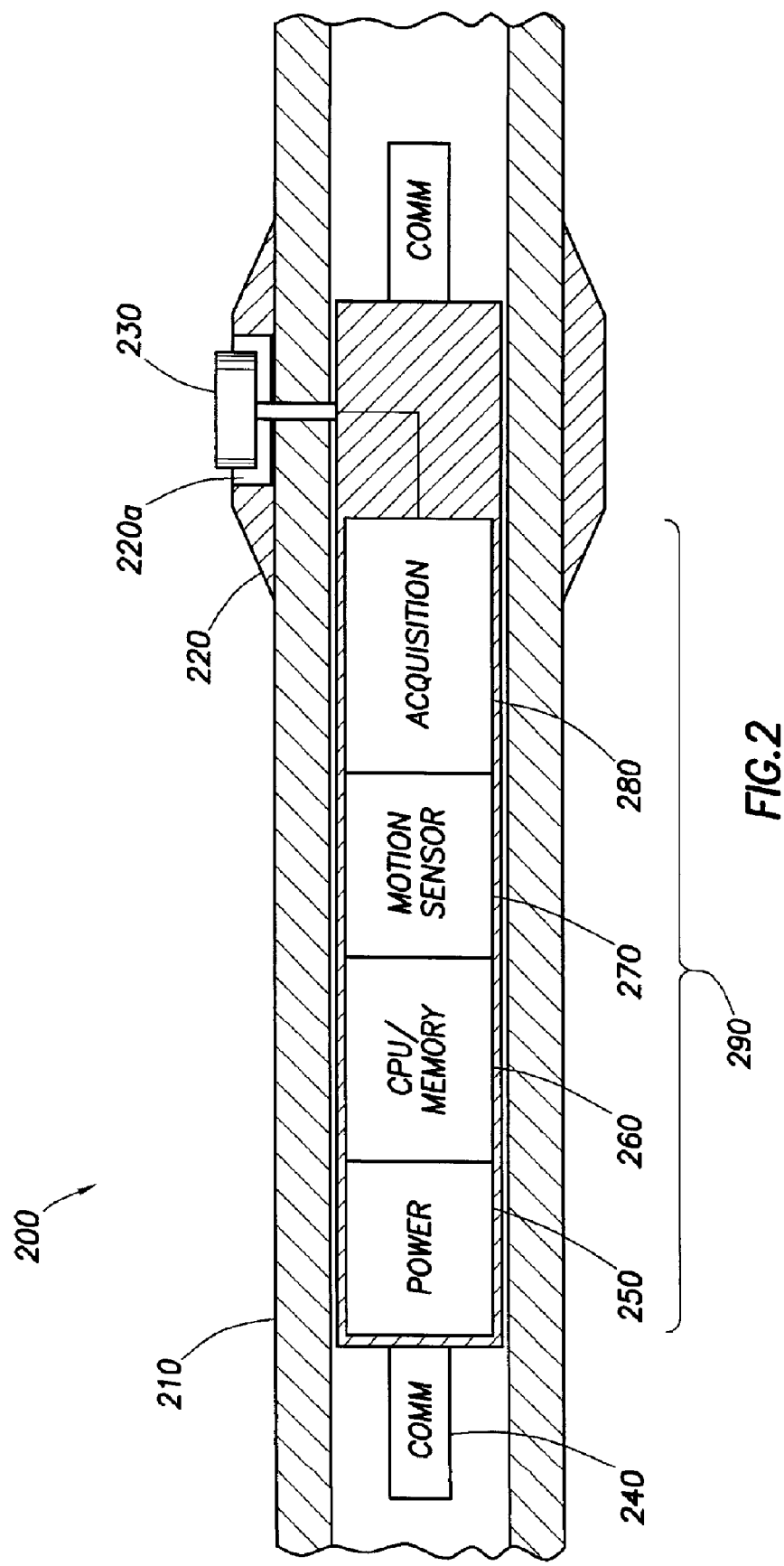
FIG. 2 shows a schematic of a modular tool design in accordance with one embodiment of the invention.

FIG. 2 shows a schematic of a modular tool design in accordance with one embodiment of the invention. As shown, a tool 200 may include a sensor module 230 mounted on a pad 220, which is disposed on a tool body (tool housing or drill collar) 210. The sensor module 230 may comprise a resistivity sensor, a sonic sensor, a neutron sensor, and the like. The specific sensor selected typically depends on the formation property of interest, mud type, quality and resolution of the data desired, and other factors. While a single sensor module 230 is shown in FIG. 2, one of ordinary skill in the art would appreciate that more sensors, of same or different types, may be included in a logging system without departing from the scope of the invention. These sensor modules may be mounted on the same or different pads, collars, stabilizers, or other part of a downhole tool.

As shown in FIG. 2, the sensor module 230 is mounted in a mounting location 220a. In accordance with embodiments of the invention, the mounting location 220a is of a selected shape and dimensions designed to accommodate various sensor modules having the same shape and dimensions, regardless of the type of the sensors. The mounting location 220a includes a common interface (or connector) to allow various sensor modules to be powered by and to communicate with the measurement system 290. One of ordinary skill in the art would appreciate that the specific shape and dimensions of the mounting location 220a may be based on the designer's choice and/or tool dimensions. Thus, the shape and dimensions of the mounting locations 220a should not limit the scope of the invention.

The sensor module 230 is operatively coupled to a measurement system 290, which, for example, may comprise a power source/module 250, a processor and memory 260, a motion sensor 270, and an acquisition module 280. The power source/module 250 may be a battery, a turbine-alternator assembly, or a power connection to another tool. The processor and memory 260 is for data storage and may include programs for data acquisition and processing. The motion sensor 270, which detects the motion and orientation of the tool or sensors, may comprise accelerometers, magnetometers, and/or a gyro. The acquisition module 280 comprises electronics for controlling data acquisition by the sensor. Note that the above list of components is for illustration only. For example, some of the modules illustrated may be combined or divided into different modules. One of ordinary skill in the art would appreciate that other modules/components may also be included. For example, an image processing module may be included to make motion correction, image compression, etc. Alternatively, these functions may be performed by the processor and programs stored in the memory.

The measurement subsystem (or system) 290 may be operatively coupled to other parts of the measurement or drilling system via a communication link/system 240. In accordance with some embodiments of the invention, the various modules or units that comprise the measurement subsystem 290 are also in modular design such that they may be interchanged. A "modular design" as used in this description refers to a design in which similar units have same or similar dimensions and common interfaces (interconnects) such that these similar units may be interchanged without redesigning the whole system or tool. Note that similar dimensions and common interfaces are only required for units/modules (e.g., among different power modules that may be used in the same tool) that are to be used interchangeably in the tool, and it is unnecessary that all units (different modules—power module, CPU/memory, motion sensor, etc.) have the same dimensions and common interfaces. For example, if a particular logging operation requires a different power supply, the power source 250 may be swapped out with a different unit, without having to reconfigure other parts of the measurement subsystem 290. The communication link 240 may provide uphole and/or downhole connections for integration into a communications bus shared with other tools in the bottom-hole-assembly (BHA), including a tool comprising a telemetry system to send the measurement data uphole. Alternatively, the tool may store the data in internal memory during operation for later retrieval when the tool is returned to the surface.

FIG. 2 shows that the sensor module 230 is mounted in a mounting location 220a on a pad 220. In some embodiments of the invention, the mounting location 220a may be on a drill collar or a stabilizer. In some embodiments of the invention, the pad 220 is an articulating pad, which may be deployed to allow the sensor module 230 to contact the wall of the borehole. For certain measurements (e.g., resistivity measurements), reducing the stand-off of the sensor 230 may be beneficial. In general, high-resolution formation measurements tend to be shallow. Thus, it is often beneficial to minimize the sensor standoff.

While articulating pads have been around for some time for wireline tools, articulating pads are relatively rare in LWD tools because of the much harsher conditions experienced by an LWD tool. Recent technology development has made articulating pads practical in LWD tools. An example of an LWD articulating pad can be found in the PowerDrive™ tool from Schlumberger Technology Corp.

Figure 3:
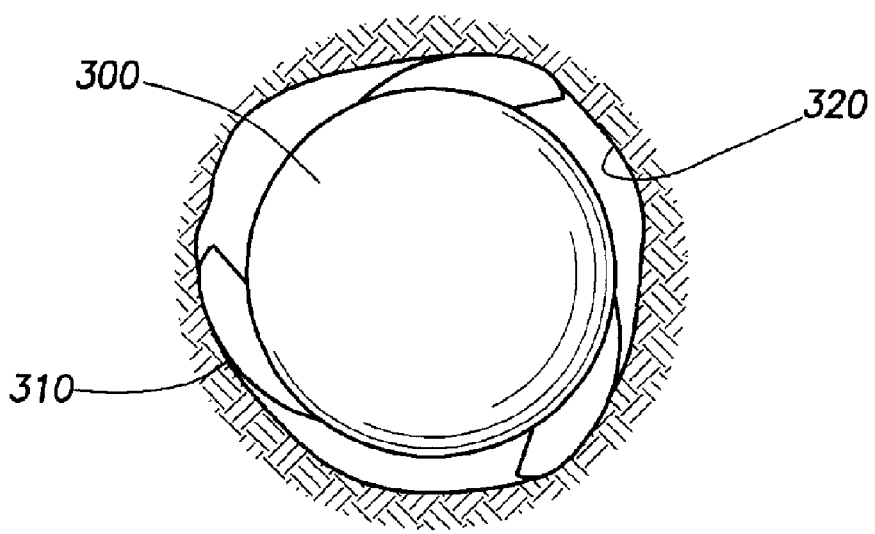
FIG. 3 shows an LWD tool having articulating pads disposed in a borehole.

FIG. 3 shows a schematic of PowerDrive™ tool 300 disposed in a wellbore 320. The PowerDrive™ tool 300 has three articulating pads 310 that are deployed to contact the borehole wall. The deployment may be by a mechanical or hydraulic mechanism. The articulating pads 310 may incorporate a sensor module (e.g., 230 in FIG. 2) and attach to the tool body at a mounting location (e.g., 220a in FIG. 2), in accordance with embodiments of the invention. One of ordinary skill in the art would appreciate that other types of articulating pads may also be used without departing from the scope of the invention. In accordance with embodiments of the invention, the modular design makes it possible to have various interchangeable pads with different sensors incorporated in them. This minimizes the engineering effort in the mechanical design and reduces the effort needed to develop additional sensor kits.

Some embodiments of the invention may provide sensors for various imaging applications. For example, in accordance with some embodiments of the invention, a sensor module may comprise a high-frequency electromagnetic propagation sensor that can be used to obtain resistivity and dielectric measurements for any mud system. These sensors modules may be based on the working principles of the existing wireline tools, such as an electromagnetic propagation tool (e.g., EPT™ from Schlumberger Technology Corporation). The working principles of an EPT™ like tool can be found in U.S. Pat. No. 3,944,910 issued to Rau and U.S. Pat. No. 4,704,581 issued to Clark. These two patents are assigned to the present assignee and are incorporated by reference in their entireties.

Some embodiments of the invention may provide very high-resolution imaging based on wireline current injection tools, such as the Formation MicroImager (FMI™ from Schlumberger Technology Corporation). These sensors will be suitable for resistivity logging/imaging in wells drilled with water-based mud (WBM). The working principles of an FMI™ tools are described in U.S. Pat. No. 4,567,759 issued to Ekstrom et al. and U.S. Pat. No. 4,468,623 issued to Gianzero et al. These two patents are assigned to the present assignee and are incorporated by reference in their entireties.

Some embodiments of the invention may provide sensors having cross magnetic dipoles. These sensors are for low resistivity measurements in wells drilled with oil-based mud (OBM). In a co-pending application Ser. No. 10/812,369, filed by Homan et al. on Mar. 29, 2004, cross-dipole electromagnetic sensors are disclosed. This application is assigned to the present assignee and is incorporated by reference in its entirety. A cross dipole sensor typically comprises a transmitter antenna and a receiver antenna, the magnetic moments of which are not in the same direction. Typically, the cross-dipole transmitter and receiver magnetic moments are arranged in an orthogonal directions. These sensors may be adapted to be used in the modular design according to embodiments of the invention.

Some embodiments of the invention may provide sensors for micro-sonic propagation measurements. For description of microsonic propagation measurements, see Plona et al., "*Measurement of Stress Direction and Mechanical Damage Around Stressed Boreholes Using Dipole and Microsonic Techniques,*" SPE/ISRM 47234. Proceedings of the 1998 SPR/ISRM Rock Mechanics in Petroleum Engineering, Eurock, Part 1 of 2, Trondheim, Norway (Jul. 8-10, 1998) pp. 123-129.

Some embodiments of the invention may provide sensors for natural gamma ray measurements. In accordance with some embodiments of the invention, these gamma ray sensors may provide azimuthal measurements. These sensors measure the natural emission of gamma rays by a formation. Natural gamma ray measurements are particularly helpful because shales and sandstones typically have different gamma ray signatures that can be correlated readily between wells. Other embodiments of the invention may include a neutron source to provide gamma ray radiation. A gamma ray sensor does not need to be in close contact with a borehole wall. Therefore, sensor modules based on gamma ray detectors can be deployed on a drill collar or a non-moveable pad.

Some embodiments of the invention may provide sensors for ultrasonic pulse-echo measurements. This type of sensors also need not be in contact with a borehole wall. Therefore, they can also be deployed on a non-moveable pad or a drill collar. Ultrasonic pulse-echo measurements use an ultrasonic transducer, in the transmitter mode, to emit a high-frequency acoustic pulse towards the borehole wall, where the acoustic pulse is reflected back to the same transducer operating in the receiver mode. The measurement may consist of an amplitude of the received signal, the time between emission and reception, and sometimes the full waveform received. Tools that use this technique may have multiple transducers, facing in different directions, or may rotate the transducer while making measurements, thereby obtaining a full image of the borehole wall.

The above described are examples of sensor modules that may be used with embodiments of the invention. One of ordinary skill in the art would appreciate that other types of sensors may also be adapted in a modular design in accordance with embodiments of the invention. Therefore, the above examples are for illustration only and are not intended to limit the scope of the invention.

In accordance with embodiments of the invention, a tool comprises a common sub-system (e.g., 290 in FIG. 2) that may be shared among various sensor modules. The sensor modules preferably have a common interface to the tool acquisition electronics (or other components in the sub-system, such as the processor and the memory). In accordance with embodiments of the invention, the tool base sub-system (e.g., 290 in FIG. 2) may include the capability to uniquely identify the type of imaging sensor installed through the common interface. The system or tool can then automatically configure itself for acquisition and processing of the sensors in use. This will reduce the risk of configuration and/or processing errors.

As noted above, more than one sensors may be included in a tool. For example, in water-based mud, a high resolution current injection sensor and a natural gamma ray sensor maybe installed on the same tool This will allow simultaneous measurements or imaging of two or more different formation properties to be acquired with negligible error in relative axial position. Azimuthal position can generally be determined very accurately using acceleration and/or magnetic sensors.

Figure 4:
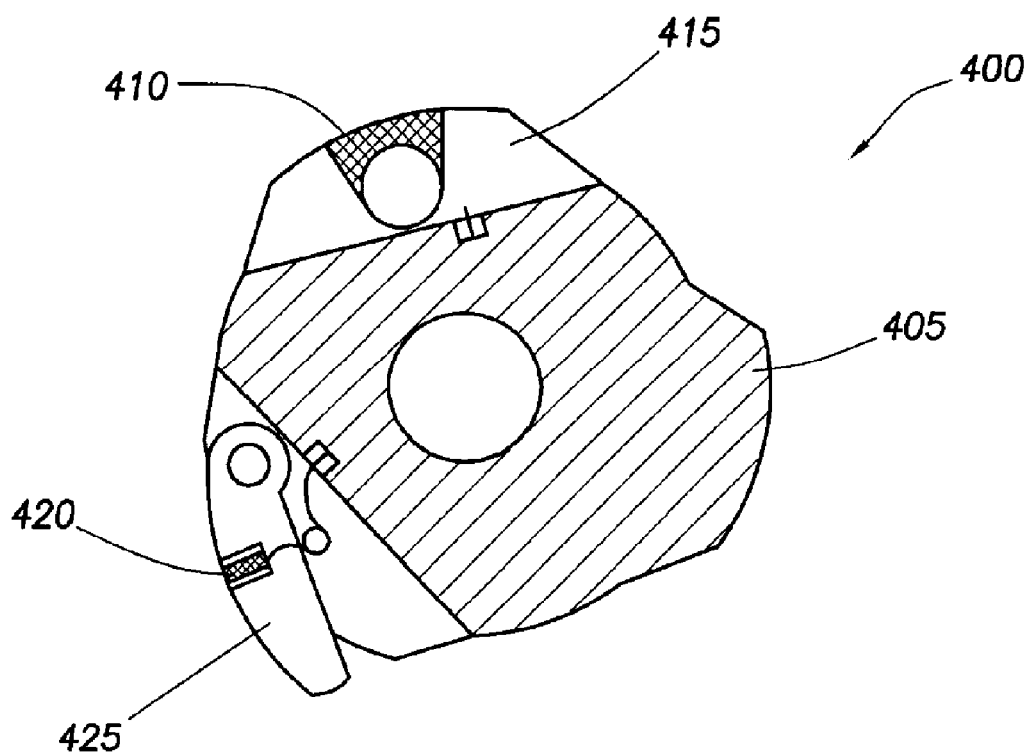
FIG. 4 shows a cross sectional view of a downhole tool in accordance with one embodiment of the invention.

FIG. 4 shows a cross sectional view of one embodiment of the invention, which includes two different types of sensors on two pads. As shown, a tool 400 includes two sensor modules 410 and 420. In this example, sensor modules 410 and 420 are of different types. For example, the sensor module 420 may be a resistivity sensor, while the sensor module 410 may be a natural gamma ray sensor. The sensor module 420 is fitted on an articulating pad 425, which may be deployed to allow the sensor module 420 to contact the wall of a wellbore. In contrast, sensor module 410 is fitted on a fixed pad 415. One of ordinary skill in the art would appreciate that a tool in accordance with embodiments of the invention may also have two or more sensor modules of the same type to provide redundant measurements or to increase the effective sampling rates. At high rates of penetration and with sensors having very high resolutions, the increase in sampling rate may be necessary to ensure adequate coverage.

Advantages of the invention may include one or more of the following. Due to diverse requirements of a typical oil and gas exploration, a single imaging system cannot satisfy all different situations. In the past, different tools are designed for different situations; this approach is costly. Embodiments of the invention addresses this problem by allowing the imaging system to be configured according to the requirements of the specific application easily. Embodiments of the invention use modular design to allow for efficient asset utilization and flexibility and a simple upgrade path for new sensor types. In addition, embodiments of the invention may be used with a wireline logging system, or a logging-while-drilling (LWD), measurement-while-drilling (MWD). or logging-while-tripping system.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A downhole logging-while-drilling or measurement-while-drilling tool for formation logging, comprising: a tool body configured to move in a borehole; a plurality of sensor modules, at least one sensor module mounted in at least one mounting location on the tool body, wherein the at least one sensor module is interchangeable with other sensor modules that make different measurements; and a measurement system disposed in the tool body operatively coupled to the at least one sensor module, wherein the measurement system includes a capability to automatically identify a sensor module mounted in the mounting location and to configure the measurement system for acquisition and processing according to the identified sensor module; and wherein the mounting location is recessed on the tool body such that the sensor module faces the wall of the borehole, and wherein the mounting location is of a selected shape and dimensions that correspond to the shape and dimensions of the plurality of sensor modules, and wherein the measurement system includes a plurality of modular units including an acquisition module for controlling data acquisitioned by any one of the plurality of sensor modules disposed in the at least one mounting location, the plurality of sensor modules having a common interface for operatively coupling to the acquisition module of the measurement system.

2. The downhole tool of claim 1, wherein the measurement system comprises at least one of a power source, a motion sensor, a process and memory, and acquisition electronics.

3. The downhole tool of claim 2, wherein the measurement system further comprises a communication link.

4. The downhole tool of claim 1, wherein the plurality of sensor modules includes a first sensor module comprising at least one of a resistivity sensor, a sonic sensor, a neutron sensor, and a gamma ray sensor a second sensor module different from the first sensor module, each of the first and second modules having a common shape and dimensions corresponding to the shape and dimensions of the mounting location.

5. The downhole tool of claim 1, wherein the at least one mounting location on the tool body is on a drill collar, a stabilizer, or a pad.

6. The downhole tool of claim 1, wherein the at least one mounting location on the tool body is on an articulating pad.

7. The downhole tool of claim 1, wherein the downhole tool is a logging-while-drilling tool or a measurement-while-drilling tool.

8. The downhole tool of claim 1, wherein the at least one sensor module comprises at least two sensor modules having different types of sensors.

9. The dowahole tool of claim 1, wherein the at least one sensor module comprises at least one of a high-frequency electromagnetic propagation sensor, a high-resolution current injection sensor, a cross magnetic dipole sensor, a micro-sonic propagation sensor, an azimuthal natural gamma ray sensor, and an ultrasonic echo-pulse sensor.

* * * * *